April 28, 1925.
E. G. THOMAS
REGISTERING DEVICE
Filed May 27, 1921
1,535,749
2 Sheets-Sheet 1
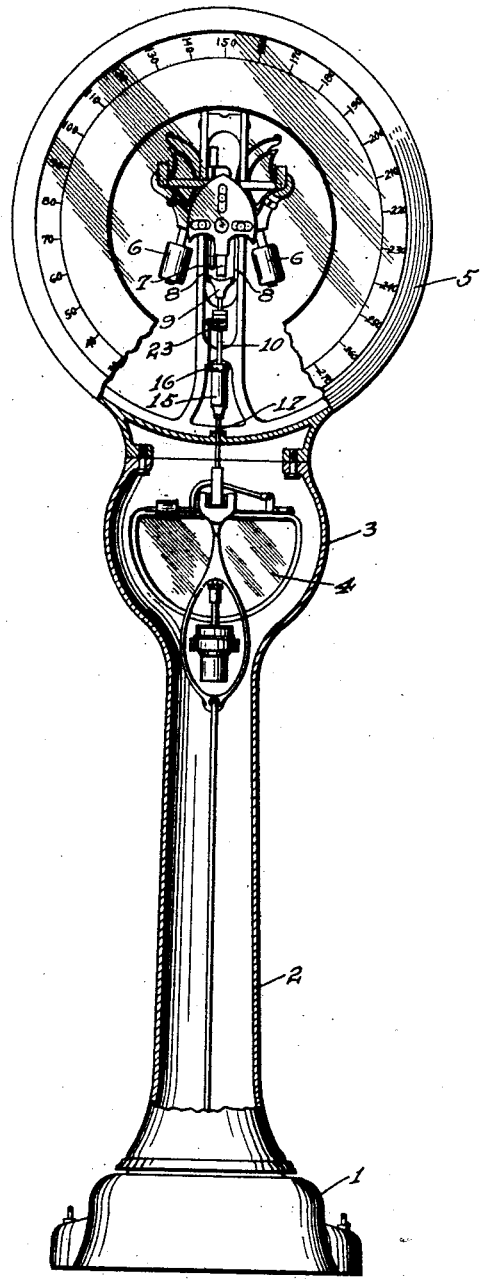
Fig. I.
Inventor
EDWARD G. THOMAS
By C. O. Marshall.
Attorney

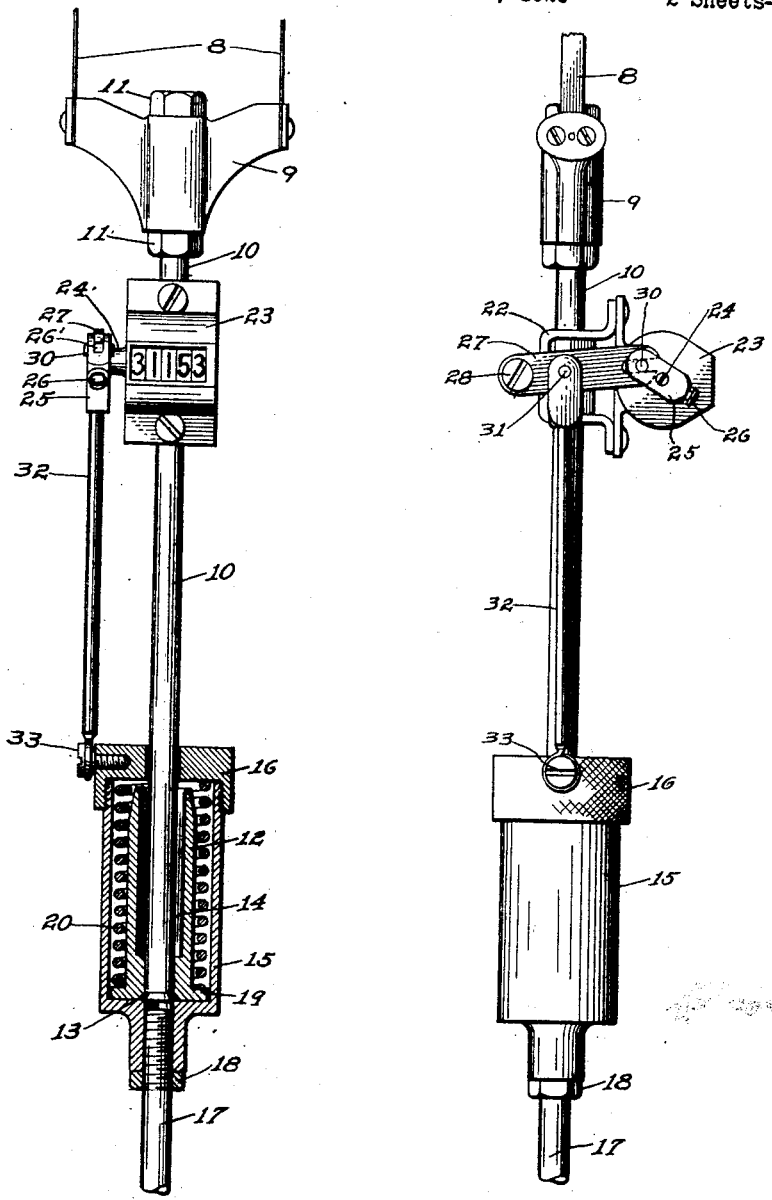

Patented Apr. 28, 1925.

1,535,749

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

REGISTERING DEVICE.

Application filed May 27, 1921. Serial No. 473,100.

*To all whom it may concern:*

Be it known that I, EDWARD G. THOMAS, a citizen of the United States, residing at Toledo, in the county of Lucas and State of Ohio, have invented certain new and useful Improvements in Registering Devices, of which the following is a specification.

My invention relates to automatic scales, and more particularly to a scale involving a registering device for the purpose of registering or totaling the number of weighing operations performed.

One object of the invention is to provide a simple device which will register the total number of articles weighed upon the scale.

Another object is to provide a counting device which will be positively operated with each weighing operation and which does not impair the operation of the scale.

Still another object is to so locate the counter or totaling device that it may be easily read by the person standing before the dial.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation of a scale embodying my invention, parts being broken away to show the manner of mounting the registering device;

Figure 2 is an enlarged fragmentary view, partly in section, showing the counter and the operating mechanism therefor; and Figure 3 is an enlarged side elevation showing the counter and operating mechanism in their normal positions.

I have shown my invention as applied to a scale of the type known as a person weigher, with which, because of the advertising nature of such scales, it is particularly useful. It may also, however, be used for tallying the number of loads which are passed over scales in industrial and commercial establishments. Since my invention does not reside in the weighing mechanism per se, this mechanism will be described only with such particularity as will suffice to clearly show the connection of the other elements of the invention therewith.

As shown, the scale base 1 is comparatively small so that several persons cannot stand upon the scale at the same time. Secured to the base 1 and extending upwardly from the rearward end thereof is a hollow column 2. The upper end of this column is flared, as at 3, and is provided with windows 4 through which a portion of the weighing mechanism is visible. Supported upon the flared upper end of the column 2 is a substantially watch-case-shaped housing 5 having a crystal in its forward face which displays the load-offsetting mechanism of the scale.

The load-offsetting mechanism shown is of substantially the automatic pendulum type described and claimed in U. S. Patent No. 1,203,611, to Hapgood, November 7, 1916, and includes a pair of oppositely-swinging pendulums 6 which swing outwardly and upwardly to offset the load on the scale. The pendulum mechanism is suitably connected to an indicator hand 7 which indicates the load upon the dial displayed through the face of the housing 5. Attached to the lower extremities of the downwardly extending ribbons 8, which are connected to the power sectors of the pendulum mechanism, is a yoke 9. The yoke is bored to receive the connecting rod 10, said rod being retained in a rigid position relatively thereto by nuts 11. Adjustment may be had by loosening one nut and tightening the other, thus shifting the rod 10 vertically.

Snugly fitted on the lower end of the rod 10 is a bushing 12, the end of the rod being headed, as at 13, into a countersink in the lower end of the bushing, which is thereby fixed upon the rod. The bushing is counterbored at 14 for the purpose of eliminating excess weight and to enable the bushing to be more easily forced upon the rod. Surrounding the bushing 12 is a hollow shell-like cylinder 15, the upper end of which is externally threaded to receive a cap 16, the lower end being bored out and threaded to receive a tension rod 17, said rod being locked in position by the nut 18.

Resting upon a shoulder 19 of the bushing 12 and interposed between said bushing and the walls of the cylinder 15 is an expansive spring 20 adapted to maintain the lower face of the bushing 12 in contact with the bottom of the cylinder.

The connecting rod 10 and tension rod 17 with the parts connecting them thus form the steelyard rod of the scale.

Rigidly mounted upon the connecting rod 10 is a bracket 22 which carries a counting or registering device 23. My invention does not reside in the counting mechanism per se, as any counting device may be incorporated in this mechanism, but in the specific embodiment of my invention herein described a counter of the Veeder type is employed. This counter is well known in the commercial world and is particularly well adapted for use in my device. Mounted on the short shaft 24 which operates the counting device is an oblong block 25 held in position by the set screw 26. One end of the block 25 has a vertical slot 26 knurled therein which receives the end of an arm 27, the other end of the arm being pivoted to the bracket 22 as at 28. The end of the arm 27 which is received in the slot 26' is provided with a notch or kerf suitably positioned to loosely engage a pin 30 mounted in the oblong block 25. Pivoted to the arm 27 at 31 is the upper extremity of a depending link 32, the lower extremity of the link being pivoted, as at 33, to the cap 16.

The tension rod 17 being connected to a system of levers in the base 1, it will readily be understood by one skilled in the art that a load placed upon the platform of the scale immediately exerts a downward pull upon the rod 17, thus causing the cylinder 15 and the cap 16 to move downwardly against the expansive force of the spring 20. It is to be understood that a relatively light load placed upon the scale platform is sufficient to overcome the expansive force of the spring 20 and that owing to the multiplication of the arm or lever 27 a very slight movement of the link 32 is sufficient to operate the counter. The cap 16 moving downwardly carries the link 32 therewith, thus imparting an oscillatory motion to the crank arm 27 and a rotary motion to the block 25 and the shaft 24. The upward end of the bushing 12 contacting with the lower face of the cap 16 acts as a stop for the downward movement of the counter operating mechanism, thus allowing the block 25 to move through a relatively small arc, the movement being, however, sufficient to operate the counter. The fact that the spring 20 is interposed in the steelyard does not reduce the pull upon the ribbons 8 or otherwise interfere with the weighing operation of the scale. As the tension rod 17 is pulled downwardly, the entire counting mechanism moves as a unit with the connecting rod 10 until the weight on the platform has been offset by the pendulums 6. When the load on the platform is removed the mechanism again assumes the normal position shown in Figures 2 and 3, the cylinder 15, cap 16, and link 32 being held in their uppermost positions by the expansive force of the spring 20.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, weighing mechanism including a load-receiver, automatic load-counterbalancing mechanism and means connecting said automatic load-counterbalancing mechanism with said weighing mechanism, and a registering device connected to said weighing mechanism for counting the loads received by said load-receiver.

2. In a weighing scale, in combination, weighing mechanism including a load-receiver, automatic load-counterbalancing mechanism and longitudinally movable means connecting said load-receiver and said automatic load-counterbalancing mechanism, a registering device mounted upon said connecting means, and means for operating said registering device upon longitudinal movement of said connecting means.

3. In a weighing scale, in combination, a load-receiver, automatic load-counterbalancing mechanism, a connection from said load-receiver to said automatic load-counterbalancing mechanism, a dial having a cut-out portion adapted to display said automatic load-counterbalancing mechanism and a portion of said steelyard rod, and a registering device mounted upon said steelyard rod in position to be visible through the cut-out portion of said dial.

4. In a weighing scale, in combination, a load-receiver, automatic load-counterbalancing mechanism, extensible means connecting said load-receiver and said automatic load-counterbalancing mechanism and adapted to be extended by a load on said load-receiver, a registering device, and connections from said registering device to said extensible connecting means for operating said registering device upon the extension of said extensible connecting means.

5. In a weighing scale, in combination, a load-receiver, load-counterbalancing mechanism, means connecting said load-receiver and said load-counterbalancing mechanism, said connecting means being composed of two relatively movable members, a registering device mounted upon one of said members, and means for connecting the registering device to the other of said members whereby the registering device is operated by the pull of the load upon the means connecting said load-receiver and said load-counterbalancing mechanism.

6. In a weighing scale, in combination, a load-receiver, load-counterbalancing mechanism, means connecting said load-counterbalancing mechanism and said load-receiver comprising two relatively movable members, a spring holding said members against relative movement, a registering device mounted upon one of said members, and means connecting said registering device to the other of said members whereby said registering device is operated by relative movement of said members against the tension of said spring.

7. In a weighing scale, in combination, a load-receiver, automatic weighing mechanism, means connecting said load-receiver and said automatic weighing mechanism comprising two relatively movable members having their longitudinal axes in substantial alignment, a spring yieldably connecting said members, a counting device mounted on one of said members, and means connecting said counting device and the other of said members.

EDWARD G. THOMAS.

Witnesses:
 FRANCES DOYLE.
 HARRY ERNSBERGER.